(12) United States Patent
Johnston et al.

(10) Patent No.: US 10,737,127 B2
(45) Date of Patent: Aug. 11, 2020

(54) FLAME MITIGATION DEVICE (FMD) FOR USE WITH A PORTABLE FUEL CONTAINER

(71) Applicant: Scepter Manufacturing, LLC, Wilmington, DE (US)

(72) Inventors: Damon A. Johnston, Land O Lakes, FL (US); Arash Nik-seresht, Aurora (CA); Gary A. Cone, Grosse Pointe Farms, MI (US)

(73) Assignee: Scepter Manufacturing, LLC., Wilmington, DE (US)

( * ) Notice: Subject to any disclaimer, the term of this patent is extended or adjusted under 35 U.S.C. 154(b) by 308 days.

(21) Appl. No.: 15/939,856

(22) Filed: Mar. 29, 2018

(65) Prior Publication Data

US 2019/0299039 A1    Oct. 3, 2019

(51) Int. Cl.
*A62C 3/06* (2006.01)
*B65D 90/22* (2006.01)
(Continued)

(52) U.S. Cl.
CPC ............ *A62C 3/065* (2013.01); *B65D 25/385* (2013.01); *B65D 90/22* (2013.01); *B65D 90/52* (2013.01);
(Continued)

(58) Field of Classification Search
CPC ........ A62C 3/065; B65D 90/22; B65D 90/52; B65D 25/385; B67C 2003/2668; B60K 2015/0483; B60K 2015/049
(Continued)

(56) References Cited

U.S. PATENT DOCUMENTS

| 15,206 | A |   | 6/1856 | Winslow |
|---|---|---|---|---|
| 1,283,384 | A | * | 10/1918 | Weil ................... B65D 83/687 |
|   |   |   |   | 222/80 |

(Continued)

FOREIGN PATENT DOCUMENTS

| EP | 2812275 B1 | 10/2017 |
|---|---|---|
| GB | 0722106.2 | 3/2008 |

(Continued)

OTHER PUBLICATIONS

Stevick, Glen et al; "Failure Analysis and Prevention of Fires and Explosions with Plastic Gasoline Containers"; Journal of Failure Analysis and Prevention (2011) 11:455-465; ASM International; May 4, 2011.

(Continued)

*Primary Examiner* — Fenn C Mathew
*Assistant Examiner* — Jennifer Castriotta

(57) ABSTRACT

A flame mitigation device (FMD) for use within a portable fuel container includes a generally cylindrical body having an interior sidewall and exterior sidewall. An annular rim is configured at an upper end of the body and a bottom wall is further configured at a lower end of the body. The FMD includes one or more indented fuel flow members extending from the interior of the annual rim for decreasing cyclonic effect of fuel flowing into the body and a plurality of stepped ribs configured on the interior sidewall of the body for centering diesel and gasoline fuel pump nozzles when inserted into the body. A reverse domed shaped bottom help to disperse fuel though a plurality of substantially rectangular shaped holes through the side wall and bottom wall.

27 Claims, 5 Drawing Sheets

(51) Int. Cl.
*B65D 90/52* (2006.01)
*B65D 25/38* (2006.01)
*B60K 15/04* (2006.01)
*B67C 3/26* (2006.01)

(52) U.S. Cl.
CPC ............................ *B60K 2015/049* (2013.01); *B60K 2015/0483* (2013.01); *B67C 2003/2668* (2013.01)

(58) Field of Classification Search
USPC ................................................ 220/88.2, 86.2
See application file for complete search history.

(56) References Cited

U.S. PATENT DOCUMENTS

| | | | |
|---|---|---|---|
| 1,974,091 A | | 9/1934 | Wortmann |
| 2,275,318 A | | 3/1942 | Rasmussen |
| 2,379,735 A | | 7/1945 | Meikle |
| 2,736,386 A | | 2/1956 | Klopar |
| 2,850,083 A | | 9/1958 | Frost |
| 4,013,190 A | | 3/1977 | Wiggins et al. |
| 4,065,024 A | | 12/1977 | Atwell |
| 4,270,506 A | | 6/1981 | Lowe |
| 4,489,860 A | | 12/1984 | Flider |
| 4,597,504 A | | 7/1986 | Witt |
| 4,630,748 A | * | 12/1986 | Keller ................ B60K 15/0403 220/86.3 |
| 4,673,098 A | | 6/1987 | Fenton et al. |
| 4,834,151 A | | 5/1989 | Law |
| 5,732,840 A | * | 3/1998 | Foltz ..................... B60K 15/04 141/325 |
| 6,318,604 B1 | | 11/2001 | Messner |
| 6,338,319 B1 | | 1/2002 | Vago |
| 6,966,349 B1 | * | 11/2005 | Laduke ................. B60K 15/04 141/367 |
| 7,040,360 B2 | * | 5/2006 | Watson ............. B60K 15/0403 141/255 |
| 9,174,075 B2 | | 11/2015 | Cray |
| 9,205,292 B2 | | 12/2015 | Riordan |
| 9,222,487 B2 | | 12/2015 | Alioto et al. |
| 9,731,155 B2 | * | 8/2017 | Riordan ..................... F23K 5/16 |
| 2004/0065687 A1 | | 4/2004 | Mack, Jr. |
| 2007/0194053 A1 | | 8/2007 | Ophardt |
| 2008/0011667 A1 | | 1/2008 | Ruschke |
| 2014/0034638 A1 | * | 2/2014 | Whelan ................. B60K 15/04 220/86.2 |
| 2017/0305737 A1 | * | 10/2017 | Hines ................ B60K 15/0406 |
| 2018/0221693 A1 | * | 8/2018 | Cray ..................... A62C 3/065 |

FOREIGN PATENT DOCUMENTS

| | | |
|---|---|---|
| GB | 2499047 A | 8/2013 |
| WO | 2009060162 A2 | 5/2009 |
| WO | 2013117921 A1 | 8/2013 |

OTHER PUBLICATIONS

Daniels, Mark et al; Outlet Filter Screen for a Portable Fuel Container; U.S. Appl. No. 61/674,050 Published Pursuant to Bankruptcy Petition; Publicly Available Jul. 20, 2012.

* cited by examiner

FLAME MITIGATION DEVICE (FMD) FOR USE WITH A PORTABLE FUEL CONTAINER

FIELD OF THE INVENTION

The present invention relates generally to flame mitigation and more particularly to a flame mitigation device used in connection with a portable fuel container for transporting, storing and dispensing a flammable liquid.

BACKGROUND

Consumer portable fuel containers (CPFCs) are well known in the art. They are used to transport, store and dispense diesel fuel and gasoline. Consumers utilize the CPFCs in connection with a fuel tank typically associated with an internal combustion engine such as a lawnmower, chain saw, snowmobile, power generator or the like. As used herein, the term, portable fuel container refers to a container that can be carried by the consumer. Such portable fuel containers have traditionally been constructed of metal or synthetic resin.

Some containers have included a flash inhibitor, which is a screen used in connection with the pouring nozzle. The flash inhibitor works to eliminate or reduce the possibility of portable fuel container explosion by preventing sparks and flame from entering the container. However, fuel containers that are made of metal (specifically safety cans) often employ a metal flame arrestor. The flame arrestor used with a CPFC is fitted inside the neck of the tank that prevents the spark or flame from entering the container through the spout. Although the benefits of the flame arrestor are well known, pumping gasoline through a flame arrestor screen can obstruct flow, causing the fuel to splash back out of the container, which can be dangerous as the fuel is easily combustible. Additionally, fuel moving through a metal screen can cause a spark caused by static electricity. Metal safety cans are configured to ground areas of the can to prevent static buildup but grounding is not possible when using CPECs manufactured from plastics or other resins.

Thus, while the use of existing flame arrestors may have benefits, its limitations, especially in the context of use in a synthetic resin portable fuel container, still present problems. Although the flame arrestor is intended to arrest or prevent a spark or flame from entering the container, the user often tries to removes it because of its difficult in use. Accordingly, consumers desire durable flame arrestors that will present no obstacles in their implementation and use.

SUMMARY OF THE INVENTION

A flame mitigation device (FMD) for use within a portable fuel container includes a generally cylindrical body having an interior sidewall and exterior sidewall. An annular rim is configured at an upper end of the body and a bottom wall is configured at a lower end of the body. At least one indented fuel flow member extends from the interior of the annual rim and is used for decreasing the cyclonic effect of fuel flowing into the body. Further, the FMD includes a plurality of stepped ribs extending inwardly within the interior sidewall, the stepped ribs are configured to align the center of a fuel nozzle with the center of the FMD and are used to reduce fuel splash from fuel flowing from a nozzle inserted into the body.

The stepped ribs further operate to accept a diesel nozzle at a first location within the body and to accept a gasoline nozzle at as second location within the body. The plurality of stepped ribs extending inwardly from the interior sidewall toward a geometric center of the generally cylindrical body, the plurality of stepped ribs being at locations on the interior sidewall, relative to each other such that they are angularly displaced from each other on the interior sidewall by about 120 degrees, relative to the geometric center. The stepped rib(s) used for a diesel fuel spout at a first location are closer to the annular rim than those ribs at a second location used for gasoline fuel and also work to reduce turbulence of fuel passing through the body.

The exterior sidewall further includes at least one cantilevered retention member configured to prevent removal of the body from within the portable fuel container. The body and bottom wall of the FMD both include a plurality of substantially rectangular perforations or holes sized to provide at least a predetermined minimum volumetric flow rate. The holes are rectangular holes that are substantially square and measure approximately 40 mils by approximately 40 mils in size and are 60 mils deep. The substantially rectangular holes are uniformly spaced apart from each other in two directions by approximately 20 mils. The bottom wall has a shape substantially the same as an inverted catenoid.

In yet another embodiment of the invention, a flame mitigation device (FMD) is described for controlling fuel flow into a fuel reservoir. The FMD includes a generally cylindrical body having an interior sidewall and exterior sidewall and an annular rim configured at an upper end of the body for holding the body into an interior of fuel reservoir. A bottom wall is configured at a lower end of the body. A plurality of stepped ribs are configured on the interior sidewall of the body for centering a fuel nozzle when inserted into the body. The ribs are sized to substantially center a diesel nozzle at a first end of the body and a gasoline nozzle at a second location of the body while also reducing turbulence of fuel passing through the body. The stepped ribs extend inwardly from the interior sidewall toward a geometric center of the generally cylindrical body, the plurality of stepped ribs being at locations on the interior sidewall, relative to each other such that they are angularly displaced apart/separated from each other on the interior wall by about 120 degrees, relative to the geometric center.

In still another embodiment of the invention, a device is described for mitigating fuel vapor ignition within a fuel container and includes a generally cylindrical body having an interior sidewall and exterior sidewall. An annular rim configured at an upper end of the body and a reverse dome bottom wall is configured at a lower end of the body. The body and bottom wall both include a plurality of substantially rectangular holes, arranged to enhance fluid flow dispersion. The rectangular holes are square holes that are approximately 40 mils×40 mils in size and spaced apart by approximately 20 mils distance.

In yet another embodiment of the invention, a flame mitigation device (FMD) is taught for use within a portable fuel container and includes a generally cylindrical body having an interior sidewall and exterior sidewall. An annular rim configured at an upper end of the body and a bottom wall is configured at a lower end of the body. A plurality of substantially rectangular perforations are included in both the cylindrical body and bottom wall and are sized 0.04 inches×04 inches and spaced 0.02 inches apart for optimizing fuel flow into and out of the body of the FMD.

In yet another embodiment of the invention, a flame mitigation device (FMD) for controlling fuel flow into a fuel reservoir is described that include a generally cylindrical body having an interior sidewall and exterior sidewall and an annular rim configured at an upper end of the body for holding the body into an interior of fuel reservoir. A bottom wall is configured at a lower end of the body; and where the exterior sidewall includes at least one cantilevered retention member configured to prevent removal of the body from within the fuel reservoir.

Finally, in another embodiment of the invention, a device for mitigating fuel vapor ignition within a fuel container includes a generally cylindrical body having an interior sidewall and exterior sidewall and an annular rim configured at an upper end of the body. A reverse dome bottom wall is configured at a lower end of the body. Both the body and bottom wall are fabricated from synthetic resin, having a substantially smooth finish for lowering surface resistance to fuel flowing within the FMD.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
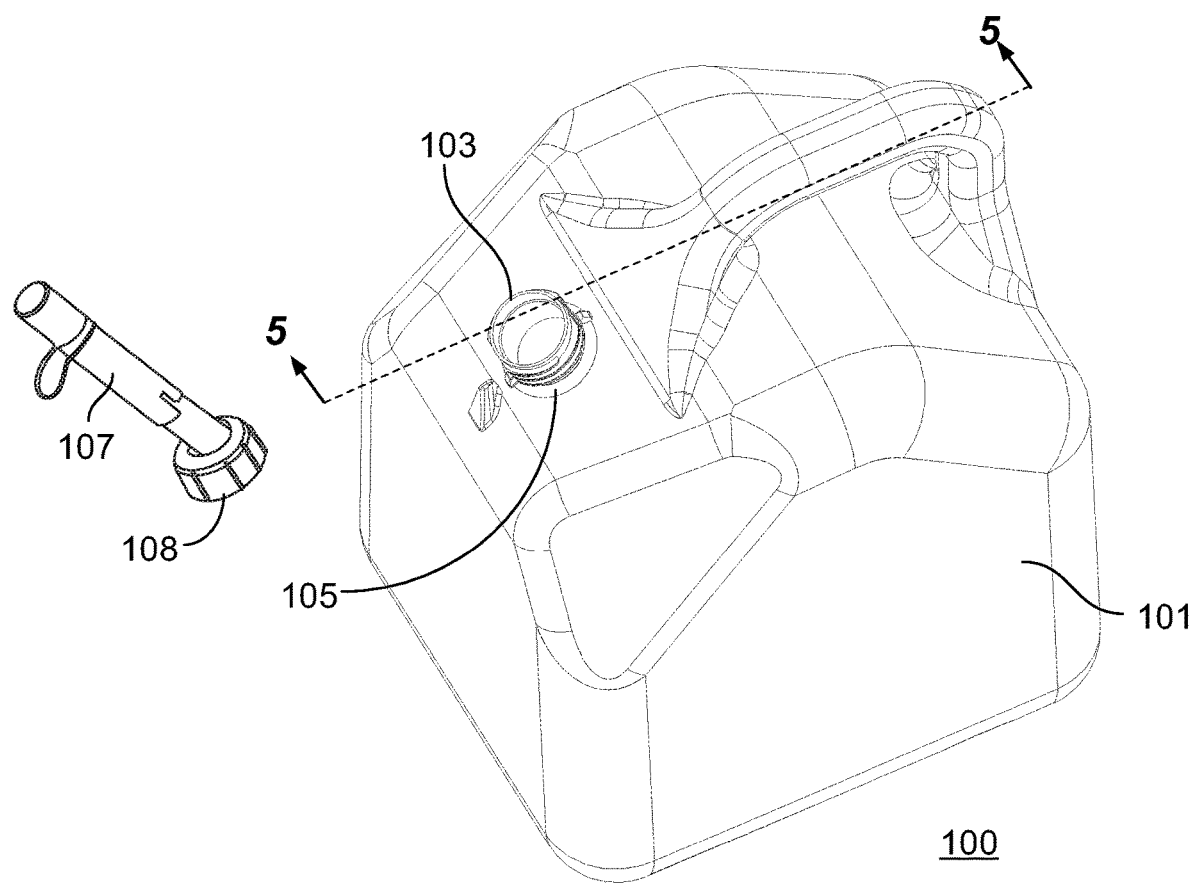
FIG. 1 is a perceptive view of a fuel container for use with a flame mitigation device (FMD) according to an embodiment of the invention.

Before describing in detail embodiments that are in accordance with the present invention, it should be observed that the embodiments reside primarily in combinations of method steps and apparatus components related to a flame mitigation device and method of forming same. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Like reference numbers are used to identify the same or similar structures in the different embodiments and views.

FIG. 1 is a perspective view illustrating a portable fuel reservoir such as container 100 for use with a flame mitigation device (FMD) according to an embodiment of the invention. With regard to FIG. 1, those skilled in the art will recognize that the portable fuel container 100 is shown as an example of the variety of different fuel containers with which the FMD may be employed. The present invention is not limited to use with or as part of the particular fuel container 100 as shown herein.

The fuel container 100 comprises a hollow tank body 101, and a neck 103 having a threaded outer surface 105. In use, a dispensing spout 107 covers the neck 103. The neck 103 is used for both filling and dispensing the fuel into and out of the container 100. Those skilled in the art will recognize that the filling and dispensing locations on the container 100 may differ being at separate locations on the container. The dispensing spout 107 is attached or held to the container at the neck 103 using a fitting 108, which is threadably attached to the neck 103. Once attached, the spout 105 is in fluid communication with the tank body 101. In the example shown in FIG. 1, both the dispensing spout 107 and the fitting 108 are coupled together whereby unscrewing the fitting 108 causes the spout 107 to be detached from the container 100 as a unit.

When the dispensing spout 107 is removed, as shown in FIG. 1, a hole or opening is exposed. The opening permits filling the tank body 101 with fuel. When the spout 107 is removed, fuel may also be poured from the tank body 101. The size of the opening can be at least at least 2 square inches (50.3 mm$^2$) but is typically not more than 10 square inches (254 mm$^2$). The fuel container body 101 is portable and easy to carry having a neck 103 and spout 107 that are preferably molded of synthetic resin, such as, for example polyethylene. The finish of the synthetic resin surface is also specifically selected for minimizing climbing effect of fuel moving across it.

Figure 2:
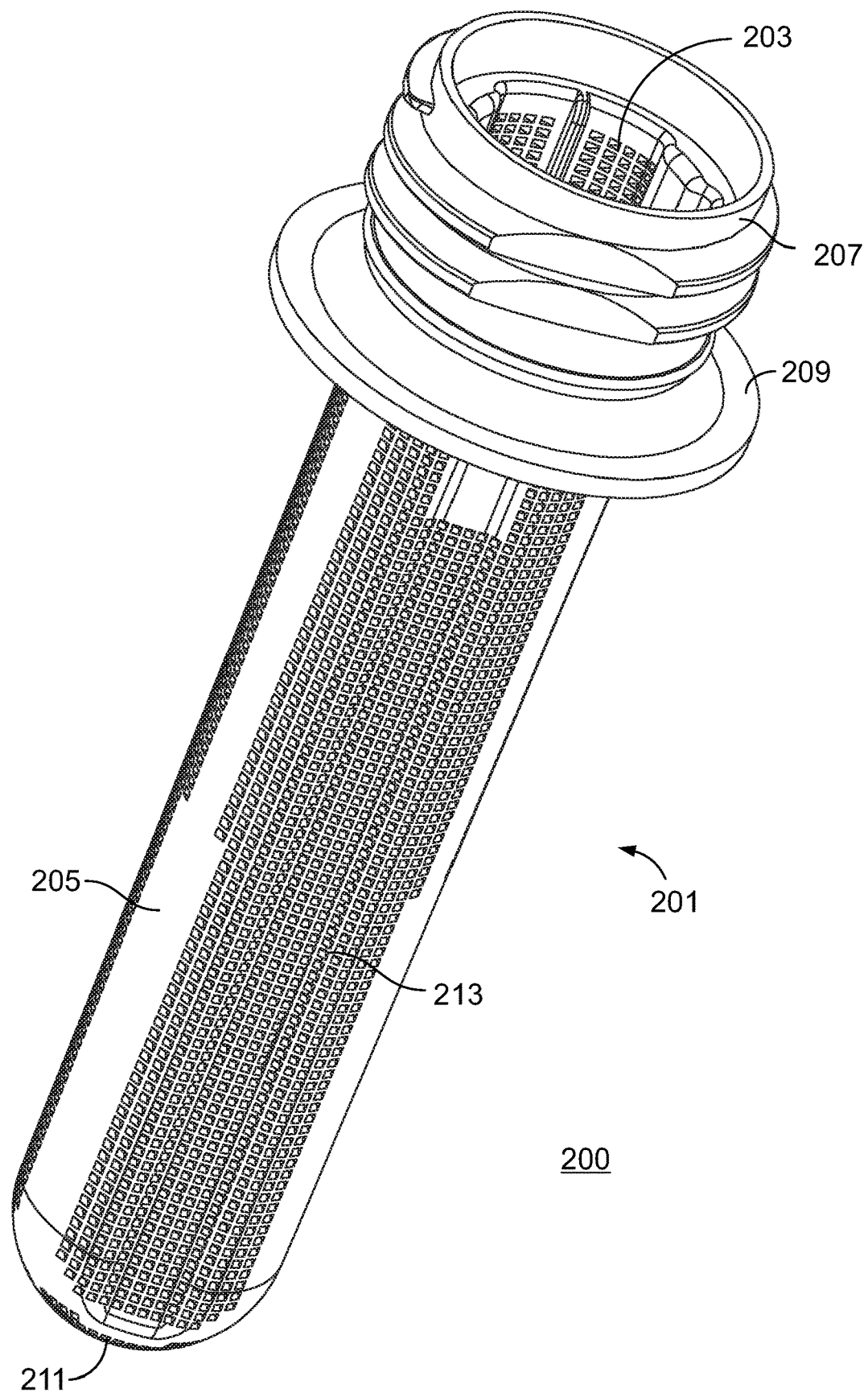
FIG. 2 is a perspective view of the FMD according to an embodiment of the invention.

FIG. 2 is a perspective view of a preferred embodiment of the FMD. The FMD 200 is used to mitigate spark and/or flame entering the interior of the tank body 101. The FMD 200 is sized and shaped, i.e., "configured" so to be capable of being inserted into the neck of a portable fuel container, such as the container depicted in FIG. 1. The FMD 200 includes a body 201 having both an inner sidewall 203 and outer sidewall 205, the general shape of which can be either cylindrical, semi-cylindrical, conical, or frusto-conical. Those skilled in the art will recognize that triangular, square and multi-angle shapes such as hexagonal or octagonal are also possible. A generally annular rim 207 the FMD extends circumferentially around an upper end of the FMD 200. Although the annual rim 207 is illustrated as generally circular in shape, those skilled in the art will recognize that other shapes of the rim are also within the scope of the invention.

A retention collar 209 holds the FMD at predetermined vertical position within the neck of a portable fuel container. The FMD 200 is preferably polyethylene, polypropylene or other synthetic resins compatible with the material the tank body is made of. In one embodiment, the outer sidewall 205 of the FMD has a slight inward taper, the taper being inwardly from its width at the retention collar 209 to the bottom wall 211 to facilitate molding, for example from between about 0.5-degree. to about 2.5-degree of taper.

The annular rim 207 surrounds an open area into which a fuel nozzle may be inserted. The retaining collar 209 projects outwardly from the outer sidewall 205 a sufficient distance to engage an inner surface of the neck of the portable fuel container into which it is to be received. As described herein, the body 201 and bottom wall 211 are "perforated" which means they include numerous perforations or holes 213. The holes 213 can have any shape but they are preferably rectangular-shaped in order to increase/maximize the fractional portion or percentage of the sidewall that can be made open and allow fluid to pass through the FMD and into as well as out of the container.

Figure 3A:
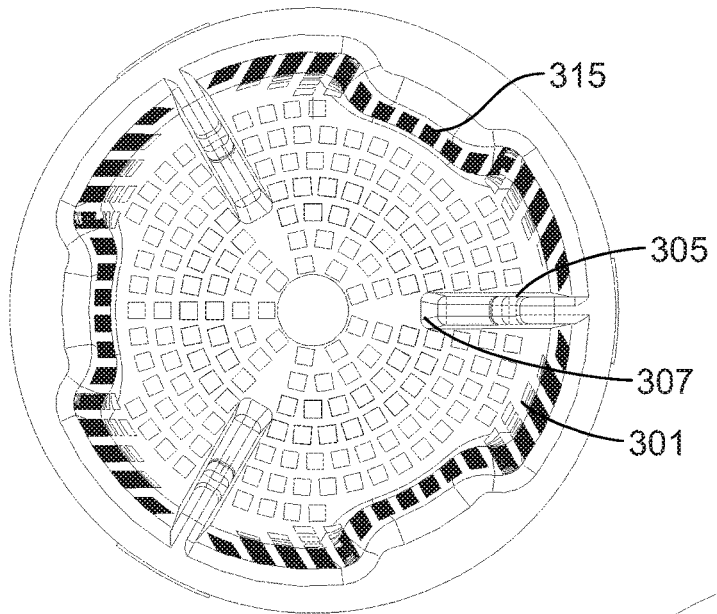
FIG. 3A is a top view illustrating the top of the FMD with indented fuel flow member and stepped ribs.
Figure 3:
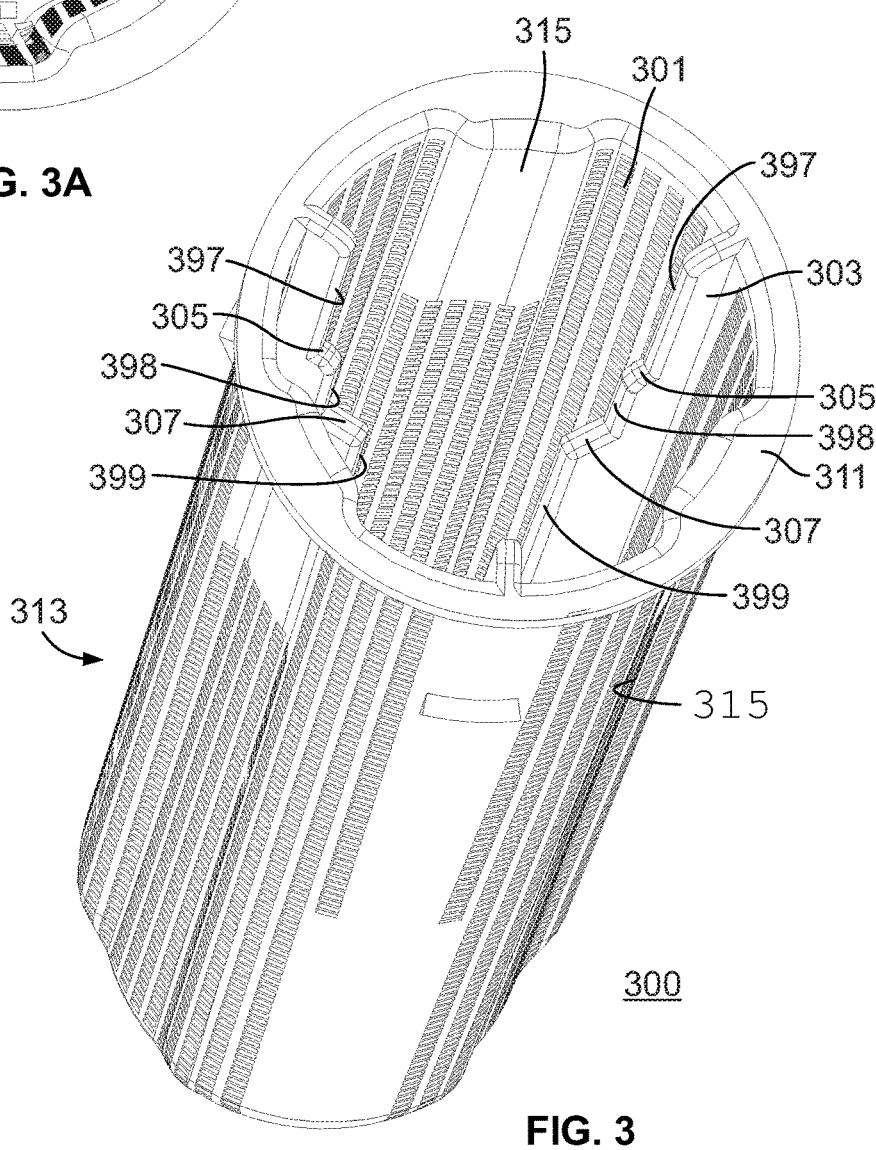
FIG. 3 is an upper perspective view showing the stepped ribs and indented fuel flow members according to an embodiment of the invention.

FIG. 3 illustrates top view of the FMD, i.e., looking down and into the "bore" of the FMD, showing a plurality of "stepped" ribs. The ribs are sized and shaped, i.e., "configured" to align the center of a fuel nozzle with the center of the FMD. More specifically, the FMD 300 includes an interior sidewall 301 having a plurality of substantially planar ribs 303, which extend axially inward from the interior sidewall 301 toward the center of the FMD. The ribs 303 extend downwardly, toward the bottom of the FMD along the interior sidewall 301. Although three (3) ribs are illustrated in this embodiment, those skilled in art will also recognize that a greater or fewer number of planar ribs 303 are also possible. For example, two ribs positioned 180 degrees apart or multiple ribs positioned at evenly spaced intervals about the interior sidewall 301 are also possible.

As used herein, the noun form of "land" refers to a surface or platform. The term "stairs refers to a series of steps or platforms for passing from one level to another. Stairs are made up of risers and treads. The "riser" is the upright or vertical portion between two stair treads. The read is the portion of a stair on which a person steps. Risers and treads on common stairs are usually orthogonal.

Referring now to FIG. 3, each rib 303 has three, stair-like "riser" portions 397, 398 and 399. The riser portions 397, 398 and 399 extend vertically away from the bottom of the FMD toward its top annular rim 311 and are substantially parallel to the interior sidewall.

Each rib also has at least two "tread" portions 305, and 307. A first "tread" portion 305 is "between" riser portions 397 and 398. A second "tread" portion 307 is between riser portions 398 and 399. The "tread" portions 305 and 307 are preferably orthogonal or substantially orthogonal to the "riser" portions 397, 398 and 399. The "tread" portions define lands or surfaces against which a fuel nozzle can rest when a fuel nozzle is inserted into the FMD during container filling.

Together, the tread portions and riser portions are considered herein as forming "steps." The steps incrementally "step down" or reduce the effective open diameter of the FMD.

The depth of the riser portions 397 relative to the side wall effectively defines a maximum diameter nozzle that can be inserted into the FMD above the first "tread" portion 305. More specifically, the first riser portion 397, the first "tread" portion 305 and the second riser portion 398 of each rib 303 are sized and shaped to allow a diesel fuel nozzle to fit into the FMD but stop at the first "tread" portion 305 of each rib 303. The first riser portions 397 are also sized and shaped to align the center of a diesel fuel nozzle with the center of the FMD.

The second riser portion 398, second tread portion 307 and third riser portion 399 are sized and shaped to allow a conventional gasoline nozzle to fit into the FMD but stop at the second "tread" portion 307. As with the first riser portions 397, the second riser portions 398 are sized and shaped to align the center of a gasoline fuel nozzle with the center of the FMD.

Stated another way, steps in each rib that are formed by "treads" and "risers" described above, can also be considered to be "notches." The first notch or land 305 in each rib 303 location 305 allows a wider diameter fuel nozzle to be inserted than does the second notch 307. The first notch 305 thus allows a diesel nozzle to fit into the FMD but does not allow a diesel nozzle to travel down the FMD any further.

Whether the rib shape is described as similar to stairs or notches, they are considered herein as forming or comprising a plurality of stepped ribs 303 that extend inwardly from the interior sidewall 301 toward a geometric center of the generally cylindrical body 313. The plurality of stepped ribs are at locations on the interior sidewall 301, relative to each other and the center of the FMD such that they are angularly displaced from each other on the interior sidewall 301 by approximately 120 degrees relative to a geometric center of the FMD.

Experimentation revealed that limiting the distance that a fuel nozzle can travel into the FMD and aligning the center of the fuel nozzle with the center of the FMD, reduced liquid fuel turbulence in the FMD. The reduced turbulence in the liquid significantly improved liquid fuel flow rate through the perforations. A direct correlation exists between ribs having steps that limit fuel nozzle insertion, distance and liquid flow rate through the perforations. Moreover, the stepped ribs 303 hold the relatively sharp edge of a fuel nozzle away from the relatively thin sidewall reducing and even preventing the nozzle from abrading the sidewall, preventing deformation of the FMD as well.

FIG. 3 and FIG. 3A illustrate the use of one or more indented fuel flow members extending from the interior of the annual rim. More specifically, an indented fuel flow member 315 is shown extending from the interior sidewall 301 under the annular rim 311. In one embodiment, three indented fuel flow members 315 are each positioned 120 degrees apart relative to the geometric center of the body 313. The indented fuel flow member(s) 315 are used for decreasing the cyclonic effect of fuel flowing into the body 313 of the FMD 300 as well as increasing rigidity of the interior sidewall 301.

Figures 4, 4A:
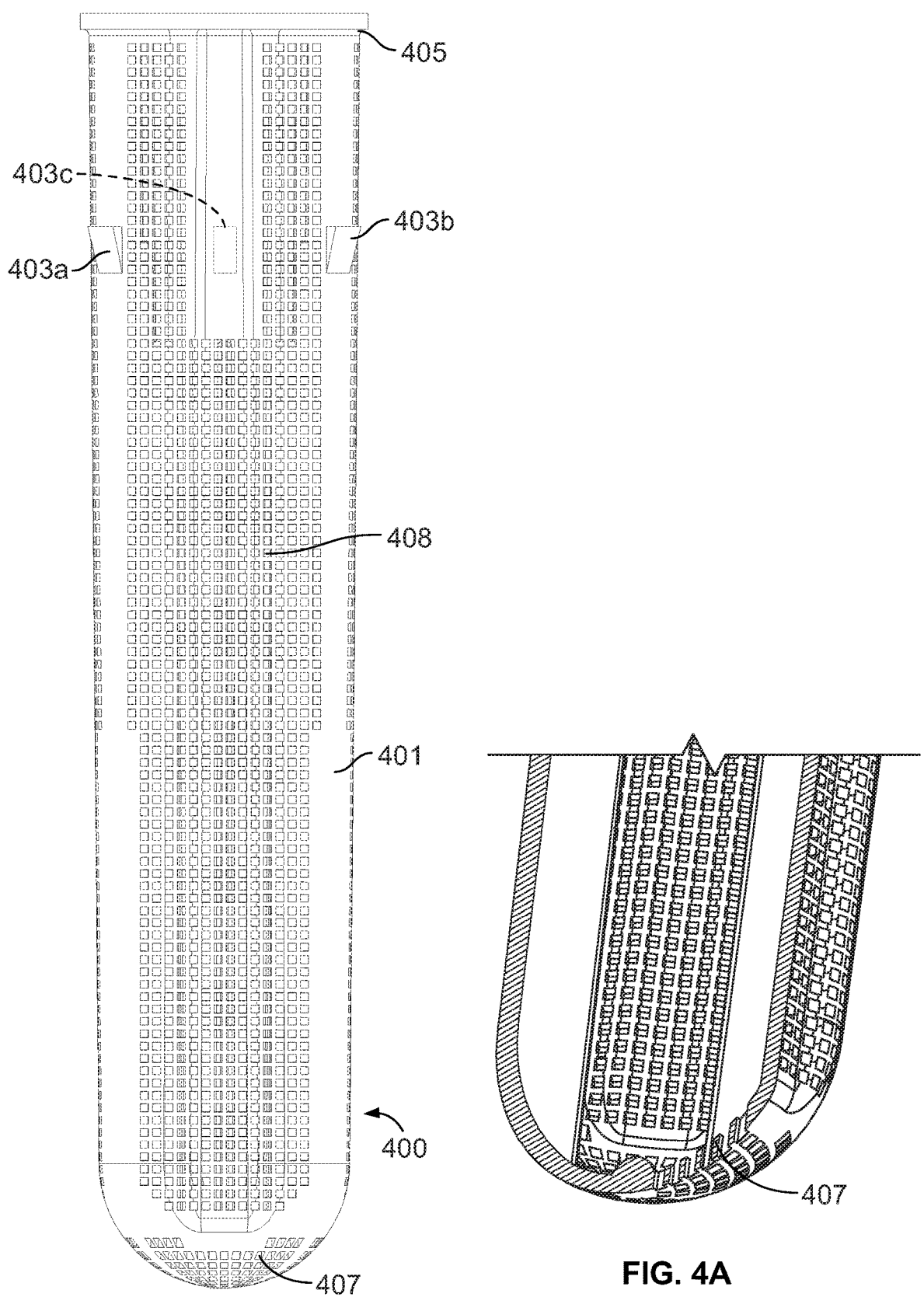
FIG. 4 is a side view of the FMD illustrating the retention members and reverse domed bottom wall according to an embodiment of the invention.
FIG. 4a is a cross-sectional view of the reverse domed bottom ball shown in FIG. 4.

FIG. 4 is a side view of the FMD using a cantilevered retention member. More specifically, the FMD 400 has an exterior sidewall 401 that uses one or more cantilevered retention member(s) 403a, 403b and 403c (shown in phantom) configured to prevent removal of the body from within the portable fuel container. The cantilevered retention members are separated at 120-degree intervals on the exterior side wall 401 and about the perimeter of the FMD. Each retention member 403a, 403b, 403c includes a cantilever or sloped surface extending from the exterior side wall 401. As seen in FIG. 4, the retention member(s) 403a, 403b are positioned approximately 1-inch (25.4 mm) below the annular ring 405. In use, the retention member 403a, 403b, 403c each frictionally engages within the container, below the neck, and are used as a safety feature for preventing accidental removal of the FMD from the interior of the fuel container. Additionally, FIG. 4 also shows the dome shaped bottom wall 407 at the lower end of the FMD 400. Although the dome shaped bottom wall 407 is illustrated as an inverted catenoid, those skilled in the art will recognize that it also may take the shape of a paraboloid of revolution or a truncated conoid. The unique shape of the bottom wall 407 increases fuel flow by its dispersion of liquid out of the side walls and across the bottom wall surface 407.

As described herein, the bottom wall 407 includes a plurality of perforations, which are sized to permit fuel such as liquid gasoline and air to flow therethrough. The number of perforations and their size and positioning in the bottom wall 407 and sidewall of body 408 are preferably sufficient to permit normal filling of the container at a moderate rate of flow without buildup and overflow of fuel from the container. For example, in certain embodiments, the size and positioning of the perforations in the FMD 400 permit at least five (5) gallons per minute of gasoline to flow therethrough under common gasoline filling conditions (e.g., atmospheric pressure and room temperature). In order to permit proper flow of liquid fuel through the FMD 400, perforations should in the 1109 exterior sidewall 401 and bottom wall 407 are sized to present an open area of not more than 0.04 inches×0.04 inches (1600 mils$^2$). The perforations are spaced 0.02 inches apart. Both the sizing and spacing between perforations is important in this application since the size of the container and pressure of the fuel in the container as well as perforation size and spacing to offer the consumer an enhanced user experience because of the optimal fuel flow through the FMD 400.

The hole size and hole spacing of the FMD as described herein are the result of experimental studies performed over several years. Several hole designs and configurations were constructed to achieve the final design of 0.040 inches×0.040 inches (1.016 mm×1.016 mm) square hole size with a wall thickness of 0.060 inches (1.524 mm) and with a 0.02 inch (0.508 mm) separation between all holes. This configuration optimizes the air to fuel mixture ratio, reduces the level of emissions, minimizes spark phenomena, achieves better venting and attains a better energy mitigation. A common approach to mitigating confined explosions is to vent the explosion using explosion relief holes. If the combustion process occurs quickly then the flame speed is enhanced, and the inertia of the surrounding atmosphere creates sufficient restriction to the expansion process and generates over pressures. The condensed hole design as defined herein, better controls the venting process and minimizes spark phenomena which leads to discharges in the gaseous chamber. Moreover, this hole design also allows for an enhanced filling flow and pouring flow for the fuel entering and leaving the container.

Figure 5:
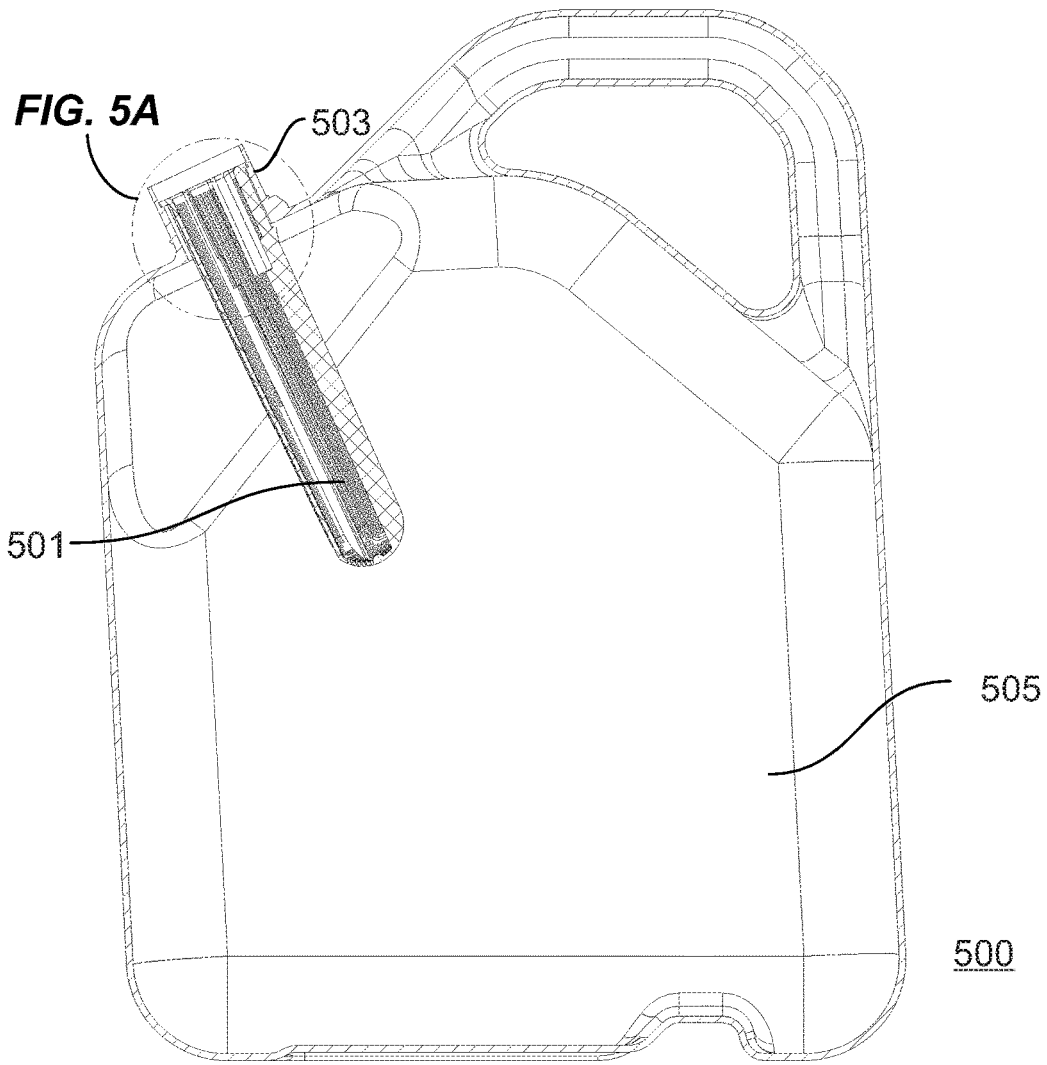
FIG. 5 is a side cross-sectional view through lines V-V of FIG. 1, illustrating the FMD inserted into the fuel tank.
Figure 5A:
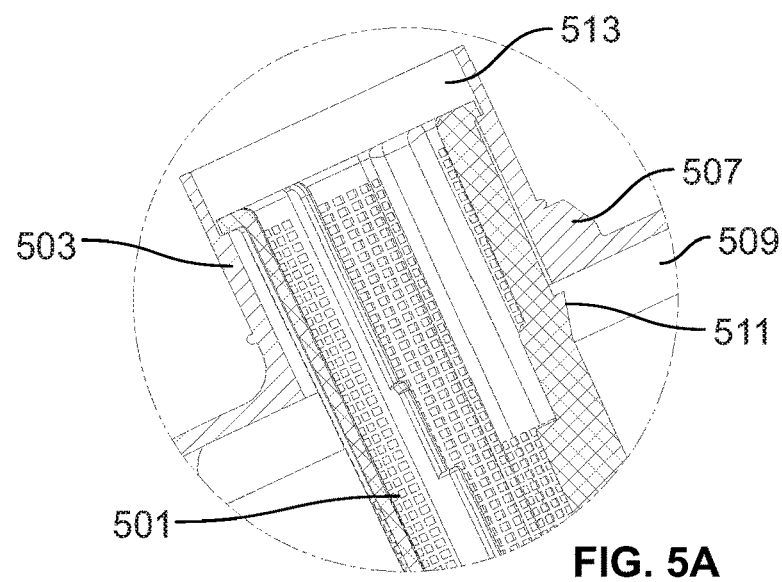
FIG. 5A is a magnified view of Detail A in FIG. 5 illustrating the FMD inserted into the neck of the fuel container.

FIG. 5 is a side view through section lines V-V in FIG. 1, illustrating the FMD inserted into the fuel opening of the container. FIG. 5A is a magnified view of the detail A shown in FIG. 5. As seen in both FIGS. 5 and 5A, a fuel tank FMD assembly 500 includes the FMD 501 inserted into the neck 503 of the fuel tank 505. In certain embodiments, it may be desired for the FMD 501 be permanently attached (i.e., non-removable) to the fuel tank 505 by, for example, bonding or welding. The FMD 500 is inserted into the tank 505 where the inner surface of the neck 503 may also be provided with a radially inwardly projecting circumferentially extending bulge, but before integration of the FMD. In FIG. 5 and FIG. 5A, the FMD 501 is pushed downwardly so that the retention collar 507, is in interference with the container outer edge 509. Each retention member 511 thus engages the below the container outer edge 509 where the sizing being complementary such that the retention member 511 is sufficiently resilient and preferably able to deflect upon such engagement. The FMD may then be rotated relative to the neck 503 to make the FMD unitary with the container 505. This creates a seal preventing air and liquid from moving between the annular rim 513 and the neck 503. This unitization of the FMD with the fuel tank 505 creates a device with enhanced fuel flow that is easy to use and ignored by the consumer.

Thus, embodiments of the present invention are directed a flame mitigation device (FMD) used in connection with a portable fuel container. The FMD includes plurality of stepped ribs each positioned 120 degrees about the interior side wall of the FMD that are used for seating both a diesel or gasoline fuel nozzle within the FMD when filling the fuel container. The stepped ribs also work to reduce fuel splash, improve fuel flow and optimize overall performance. One or more retention members are provided in the outer sidewall of the FMD for preventing inadvertent removal of the FMD from within the filler neck of the fuel container. Further, one or more intended fuel flow members are provided extending from the interior or the interior sidewall to prevent cyclonic movement of the fuel when filling the container. The FMD also includes a plurality of substantially rectangular holes on the body side wall and bottom wall that are typically square in shape. The holes are sized at $40/1000$ inch on each side and spaced $20/1000$ to provide an optimal fuel flow through the FMD while still reteaming its ability to mitigation flame and vapor ignition.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A flame mitigation device (FMD) for controlling fuel flow into a fuel reservoir comprising:
   a body having an interior sidewall and exterior sidewall;
   a generally annular rim configured at an upper end of the body for holding the body into an interior of fuel reservoir; and
   a bottom wall configured at a lower end of the body; and
   a plurality of stepped ribs configured on the interior sidewall of the body for centering a fuel nozzle when inserted into the body.

2. An FMD as in claim 1, wherein the stepped ribs are sized to substantially center a diesel fuel nozzle at a first location of the body and substantially center a gasoline fuel nozzle at a second location of the body.

3. An FMD as in claim 2, wherein the plurality of stepped ribs extend inwardly from the interior sidewall toward a geometric center of the body, the plurality of stepped ribs being at locations on the interior sidewall, relative to each other such that they are angularly displaced apart/separated from each other on the interior sidewall by about 120 degrees, relative to the geometric center.

4. An FMD as in claim 1, wherein the stepped ribs are sized, shaped and arranged to reduce turbulence of fuel passing through the body.

5. An FMD as in claim 1, wherein the generally annular rim includes at least one indented member extending inwardly from the interior sidewall.

6. An FMD as in claim 1, wherein the exterior sidewall includes at least one cantilevered retention member configured to prevent removal of the body from within the fuel reservoir.

7. An FMD as in claim 1, wherein the body and bottom include a plurality of substantially rectangular holes.

8. An FMD as in claim 7, wherein the substantially rectangular holes are substantially square and are approximately 40 mils x 40 mils in size.

9. An FMD as in claim 7, wherein the substantially rectangular holes are spaced apart by approximately 20 mils.

10. An FMD as in claim 1, wherein the bottom has a shape which is substantially the same as at least one of: a dome, and a paraboloid of revolution.

11. A device for mitigating fuel vapor ignition within a fuel container comprising:
a body having a length, an interior sidewall and exterior sidewall;
a generally annular rim configured at an upper end of the body;
a bottom at a lower end of the body, the body's length being substantially equal to the distance between the upper and lower ends of the body;
an indented fuel flow member projecting inwardly from the interior sidewall of the body;
wherein the body and bottom both include a plurality of substantially rectangular holes; and
a plurality of stepped ribs, each stepped rib extending inwardly from the interior sidewall toward a center of the body, wherein first and second stepped ribs are configured to substantially center a fuel nozzle in the body.

12. A device as in claim 11, wherein each rib of the plurality of ribs is stepped and has a first surface against which a first type of fuel nozzle rests when the first type of fuel nozzle is inserted into the body during container filling and a second surface against which a second type of fuel nozzle rests when the second type of fuel nozzle is inserted into the body during container filling, the first surface limiting how far the first type of fuel nozzle can travel into the body, the second surface limiting how far the second type of fuel nozzle can travel into the body.

13. A device as in claim 11, wherein each rib of the plurality of ribs extend inwardly from the interior sidewall toward a geometric center of the body, the plurality of stepped ribs being angularly separated from each other on the interior sidewall.

14. A device as in claim 11, wherein the exterior sidewall includes at least one cantilevered retention member for preventing removal of the body from within the fuel reservoir.

15. A flame mitigation device (FMD) for controlling fuel flow into a fuel reservoir comprising:
a body having an interior sidewall and exterior sidewall;
a generally annular rim at an upper end of the body and which is configured to hold the body in a fuel reservoir; and
a bottom at a lower end of the body; and
an indented fuel flow member extending inwardly from the interior sidewall of the body;
stepped ribs extending inwardly from the interior sidewall of the body, the stepped ribs being configured to position the center of a fuel nozzle at substantially the center of the body when the fuel nozzle is inserted a predetermined distance into the body.

16. An FMD as in claim 15, wherein the indented fuel flow member comprises an indentation.

17. An FMD as in claim 15, wherein the stepped ribs are sized, shaped and arranged to reduce turbulence of fuel passing through the body and are additionally sized, shaped and arranged to limit the distance that the fuel nozzle can be inserted into the body, to said predetermined distance.

18. An FMD as in claim 15, wherein the stepped ribs extend inwardly from the interior sidewall toward a geometric center of the body, the stepped ribs being at locations on the interior sidewall, relative to each other such that they are angularly displaced apart/separated from each other on the interior sidewall by about 120 degrees, relative to the geometric center.

19. An FMD as in claim 15, wherein the body and bottom include a plurality of substantially rectangular holes, the holes being sized and shaped to enable at least a predetermined minimum volumetric fuel flow rate through the FMD.

20. An FMD as in claim 19, wherein the substantially rectangular holes are substantially square and are approximately 40 mils x 40 mils in size and 60 mils in depth.

21. An FMD as in claim 19, wherein the substantially rectangular holes are spaced apart by approximately 20 mils.

22. An FMD as in claim 15, wherein the bottom has a shape which is substantially the same as at least one of: a dome, an inverted catenoid; a paraboloid of revolution.

23. A flame mitigation device (FMD) for use within a portable fuel container comprising: a generally cylindrical body having a sidewall, the sidewall having an interior sidewall surface and exterior sidewall surface, the generally cylindrical body also having a length; an annular rim at an upper end of the body; a bottom at a lower end of the body; wherein the length of the generally cylindrical body is substantially the same as the distance between the upper and lower ends of the body; an indented fuel flow member extending inwardly from the interior sidewall surface of the generally cylindrical body, the indented fuel flow member having a length that is substantially the same as the length of the generally cylindrical body, the indented fuel flow member being configured to reduce cyclonic flow in the body; and a plurality of stepped ribs extending inwardly within the interior sidewall, the stepped ribs being configured to align the center of a fuel nozzle with the center of the FMD and additionally configured to reduce fuel splash from fuel flowing from a nozzle inserted into the body.

24. An FMD as in claim 23, wherein the stepped ribs are additionally configured to permit insertion of a diesel fuel nozzle into the body up to a first location within the body and to permit insertion of a gasoline fuel nozzle into the body up to a second location within the body, the plurality ribs preventing insertion of a diesel fuel nozzle to said second location.

25. An FMD as in claim 24, wherein the first location is closer to the annular rim than the second location.

26. An FMD as in claim 23, wherein the plurality of stepped ribs extend inwardly from the interior sidewall toward a geometric center of the generally cylindrical body, the plurality of stepped ribs being at locations on the interior sidewall, relative to each other such that they are angularly displaced from each other on the interior sidewall by about 120 degrees, relative to the geometric center.

27. An FMD as in claim 23, wherein the stepped ribs are configured to reduce turbulence of fuel passing through the body.

* * * * *